(12) United States Patent
Starnes

(10) Patent No.: US 8,636,453 B2
(45) Date of Patent: Jan. 28, 2014

(54) INFLATABLE DUNNAGE

(75) Inventor: Christopher J. Starnes, Camarillo, CA (US)

(73) Assignee: Meissner Filtration Products, Inc., Camarillo, CA (US)

( * ) Notice: Subject to any disclaimer, the term of this patent is extended or adjusted under 35 U.S.C. 154(b) by 0 days.

(21) Appl. No.: 13/429,158

(22) Filed: Mar. 23, 2012

(65) Prior Publication Data

US 2012/0269594 A1 Oct. 25, 2012

Related U.S. Application Data

(60) Provisional application No. 61/517,448, filed on Apr. 19, 2011.

(51) Int. Cl.
*B60P 7/16* (2006.01)
*B65B 31/02* (2006.01)

(52) U.S. Cl.
USPC ............................................ 410/119; 53/432

(58) Field of Classification Search
USPC ............. 410/119, 155, 154, 96–99, 120–122, 410/39, 41; 206/522, 523, 586, 593; 141/10, 68, 114, 313
See application file for complete search history.

(56) References Cited

U.S. PATENT DOCUMENTS

| | | | | |
|---|---|---|---|---|
| 2,990,070 A | * | 6/1961 | Cushman | 410/119 |
| 4,076,872 A | * | 2/1978 | Lewicki et al. | 428/12 |
| 5,431,515 A | * | 7/1995 | Sansone et al. | 410/119 |
| 5,693,163 A | * | 12/1997 | Hoover et al. | 156/147 |
| 5,730,564 A | * | 3/1998 | Howlett, Jr. | 410/119 |
| 6,478,061 B2 | * | 11/2002 | Haberkorn | 150/154 |
| 7,090,912 B2 | * | 8/2006 | Perkins et al. | 428/166 |
| 7,290,970 B2 | * | 11/2007 | Deonarine | 410/119 |
| 7,694,820 B2 | * | 4/2010 | Liao et al. | 206/522 |
| 7,823,729 B2 | * | 11/2010 | Lee | 206/522 |
| 2009/0236338 A1 | * | 9/2009 | Elton et al. | 220/23.83 |

* cited by examiner

*Primary Examiner* — Glenn Dayoan
*Assistant Examiner* — Sunsurraye Westbrook
(74) *Attorney, Agent, or Firm* — Christie, Parker & Hale, LLP

(57) ABSTRACT

An inflatable dunnage for use in transporting biocontainers, a method for packaging a biocontainer with such dunnage and a package including such dunnage and a biocontainer. The inflatable dunnage includes an inflatable body defining opening for receiving at least one of a tubing and a fitting of a biocontainer, a port for the inlet of air, and a valve coupled to the port for controlling the inlet and outlet of air.

23 Claims, 2 Drawing Sheets

INFLATABLE DUNNAGE

CROSS-REFERENCE TO RELATED APPLICATION

This application is based upon and claims priority on U.S. Provisional Application No. 61/517,448, filed on Apr. 19, 2011, the contents of which are fully incorporated herein by reference.

BACKGROUND

Biocontainers are flexible containers which are used for the storage and transport of solutions used in the pharmaceutical industry, as well as for the growth of cells. Solutions that may be carried in a biocontainer include bio-pharmaceutical processed fluids, cultured media, buffer solutions, and active pharmaceutical ingredients. Typically, biocontainers are formed from flexible film materials. Fittings and tubing are used to allow for the ingress and egress of fluids in and out of the biocontainer.

For shipping, a biocontainer is placed in a rigid outer container and filled with the fluid to be carried. The a rigid outer container often is collapsible and is sometimes referred to in the industry as a Reusable Intermediate Bulk Container (rIBC). In some instances, the biocontainer is pre-filled with the fluid and then placed in the rigid outer container. The biocontainer is placed in the rigid outer container with its tubing being accessible, as for example from the top. A foam covering (i.e., a foam dunnage) designed to fit in the rigid outer container is fitted over the biocontainer and has an opening to allow for penetration by the biocontainer tubing. The thickness of the foam is such so as to take up the volume of space not taken up by the biocontainer in the rigid outer container. A lid is then placed over the foam. The lid is pressed down to compress the foam slightly in order to allow for latches on the lid and outer rigid container to engage each other and lock the lid on the outer rigid container. The foam dunnage serves to occupy the space not occupied by the biocontainer and presses against the flexible biocontainer filled with the fluid so as to minimize movement and sloshing of the fluid within the biocontainer. Thus, the size of the foam dunnage required is dependent on the filled size of the biocontainer and the size of the rigid outer container. Moreover, the problem with foam is that it does not adequately support the tubing and thus, the tubing may bend and the fittings may press against the biocontainer wherein the rigid outer container damaging the biocontainer. In addition, while the foam does reduce sloshing and movement of the fluid within the biocontainer, it does not exert sufficient pressure against the biocontainer and as a result the reduction of the sloshing of the fluid within the biocontainer may not be sufficient for preventing premature failures. Consequently, biocontainers still fail prematurely due to cracking caused by such sloshing and movement. Thus, an improved dunnage is desired that would further minimize movement and sloshing and that would support tubing and their fittings so as to reduce premature failures of the biocontainer and tubing.

SUMMARY OF THE INVENTION

In an exemplary embodiment a shipping package for a biocontainer containing a fluid is provided. The package includes a rigid outer container, a flexible biocontainer within the outer container, the biocontainer including at least one of a tubing and a fitting. The package also includes a n inflated dunnage over the biocontainer, the dunnage forming at least an opening penetrated by the at least one of a tubing and fitting, and a lid over the dunnage, wherein the inflated dunnage is sandwiched between the biocontainer and the lid, and wherein the dunnage exerts pressure on the biocontainer and on the lid as well as on at least a wall of the rigid outer container. In one exemplary embodiment, the inflated dunnage engages the at least one of a tubing and a fitting for providing support to the at least one of a tubing and a fitting. In another exemplary embodiment, the lid includes an opening for being penetrated by a port of the inflated dunnage. In yet another exemplary embodiment, a cap is also included for capping the opening on the lid. In a further exemplary embodiment, the dunnage is formed from a film including at least one of a polyamide and polyethylene. In yet a further exemplary embodiment, the inflatable dunnage includes a plurality of chambers. In any of the aforementioned exemplary embodiments, the dunnage is inflated with air.

In another exemplary embodiment, a method for packing a biocontainer for shipping is provided. The biocontainer is placed within a rigid outer container and contains a fluid and includes at least one of a tubing and a fitting. The method includes placing an inflatable dunnage over the biocontainer containing fluid, the dunnage including an opening, and at least one of the at least one of a tubing and a fitting penetrates the opening, placing a lid over the dunnage, and inflating the dunnage. In yet another exemplary embodiment, inflating the dunnage includes inflating the dunnage for exerting a force against the biocontainer, the rigid outer container, and the lid. In a further exemplary embodiment, the lid includes an opening and wherein a dunnage inflating port extends through the opening. In yet a further exemplary embodiment, the method also includes capping the lid opening with a cap. In any of the aforementioned exemplary embodiments, the method also includes partially inflating the dunnage prior to placing the lid. In another exemplary embodiment, partially inflating includes partially inflating the dunnage until the partially inflated dunnage provides support to the at least one a tubing and a fitting. In yet another exemplary embodiment, inflating the dunnage for exerting a force includes inflating the dunnage until the lid starts to bulge. In one exemplary embodiment, the method also includes capping the lid opening with a cap after the inflating the dunnage. In any of the aforementioned exemplary embodiments, the dunnage is inflated to a pressure not greater than 2 psi. In another exemplary embodiment, the inflatable dunnage is formed from a film including at least one of a polyamide and polyethylene. In an exemplary embodiment, the inflated dunnage fills a void between the biocontainer and the lid. In another exemplary embodiment, the dunnage includes a plurality of chambers.

In another exemplary embodiment, an inflatable dunnage for use in transporting biocontainers is provided. The inflatable dunnage includes an inflatable body defining opening for receiving at least one of a tubing and a fitting of a biocontainer, a port for the inlet of air, and a valve coupled to the port for controlling the inlet and outlet of air. In another exemplary embodiment, the body is formed from a film including at least one of a polyamide and a polyethylene. In yet another exemplary embodiment, the inflatable body includes a plurality of chambers.

DETAILED DESCRIPTION OF THE INVENTION

Figure 1:
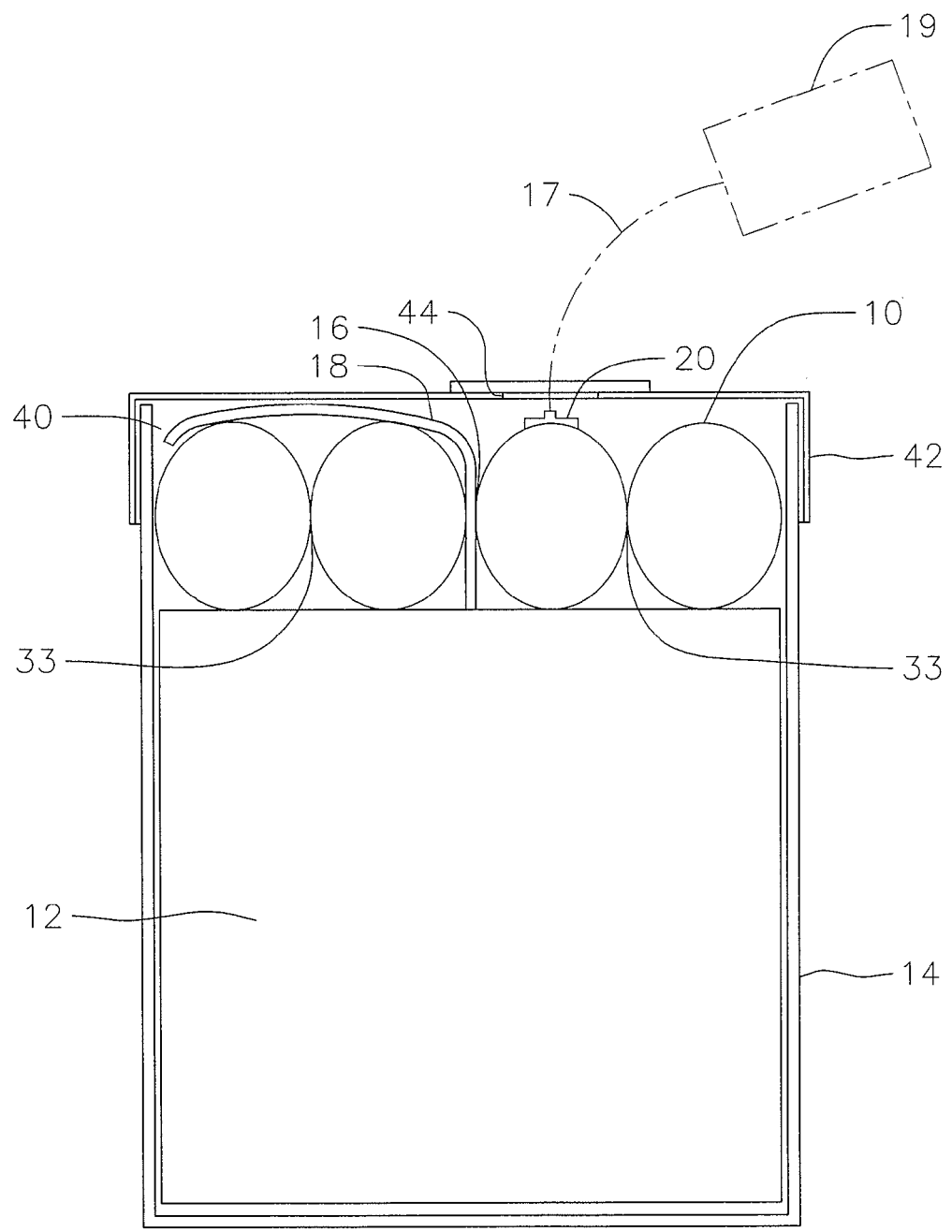
FIG. 1 is a cross-sectional view of an inflatable dunnage of the present invention incorporated over a biocontainer fitted within a rigid outer container.
Figure 2:
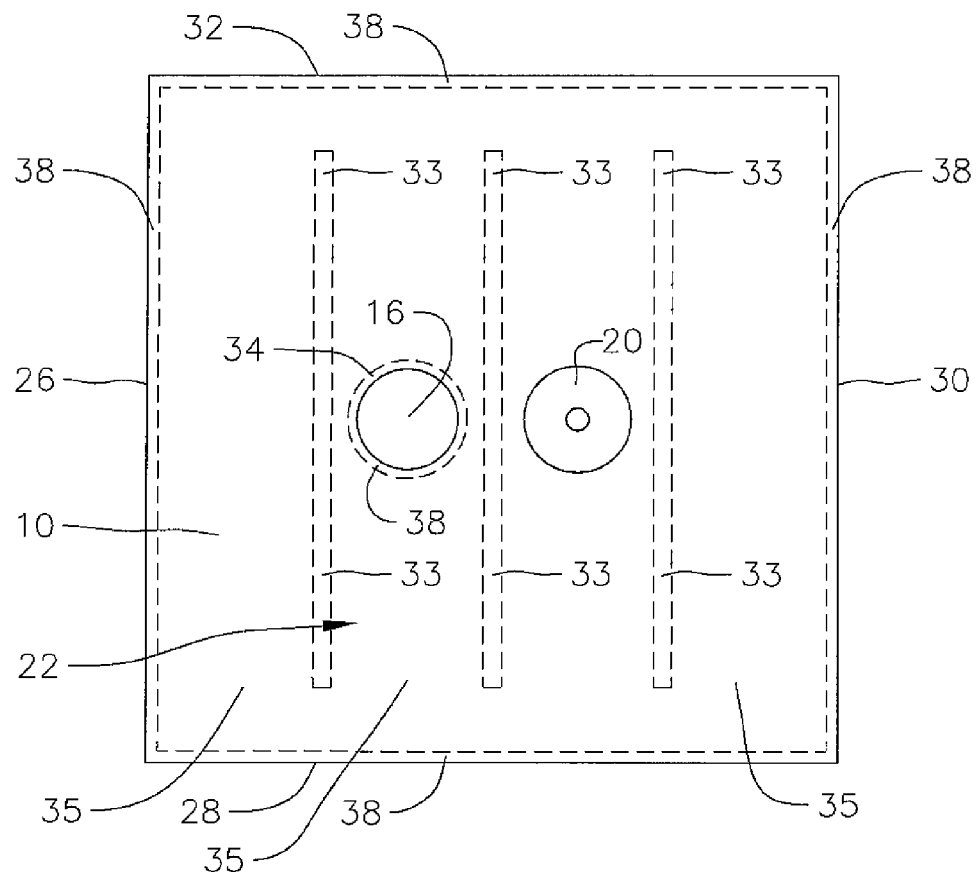
FIG. 2 is a top view of an exemplary embodiment inflatable dunnage of the present invention.
Figure 3:
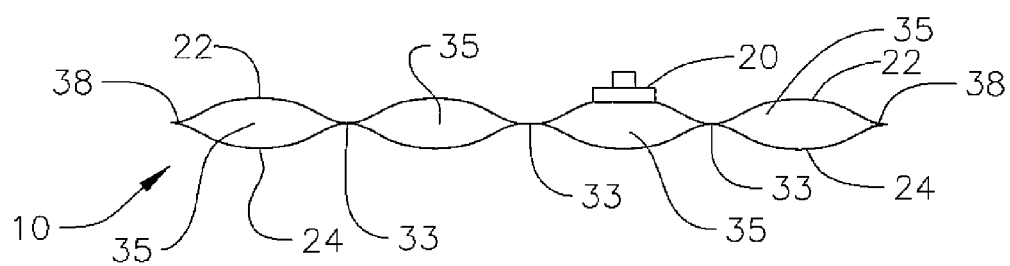
FIG. 3 is a cross-sectional view of a non-inflated dunnage of the present invention.

The present invention provides for an inflatable dunnage 10 that fits over the filled biocontainer 12 in a rigid outer container 14 as shown in FIG. 1. The inflatable dunnage has at least one opening 16 to allow for penetration by the tubing 18 and fittings of the biocontainer (FIGS. 1, 2 and 3). In addition, the inflatable dunnage includes its own fitting (i.e., valve) and tubing (or port) 20 (collective the "biocontainer tubing assembly") to allow for it to be inflated and deflated. In an exemplary embodiment, the inflatable dunnage is formed from a film of polyamide and polyethylene. The film forming the inflatable dunnage in an exemplary embodiment has a gas barrier layer so that it can be stored for a long period of time and not loose pressure because of air permeating through the film material or is made from a material having good gas barrier properties. An exemplary gas barrier material includes Ethylene Vinyl Alcohol (EVOH). Other gas barrier materials that may be used to form the film or a layer attached to the film include, but are not limited to Polypropylene, Nylon, Ethylene Vinyl Acetate. EVOH can be combined with Polyetheylene, polypropylene or Nylon to also form a gas barrier. The combination may occur using lamination or co-extrusion. In one exemplary embodiment, a dual layer film of polyethylene and Nylon is used to form the dunnage.

In an exemplary embodiment, two layers 22, 24 of film are welded together or otherwise attached to form the inflatable dunnage. In the exemplary embodiment shown in FIG. 2, the two layers of film 22, 24 are welded along edges 26, 28, 30, 32, and along the perimeter 34 of opening 16 to form welded end seams 38, as for example shown in FIGS. 2 and 3. In an exemplary embodiment the two layers are also welded along their interior to form at least one interior seam 33 forming segregated chambers 35 as for example shown in FIGS. 2 and 3. In an exemplary embodiment, the dunnage is placed over the biocontainer in the rigid outer container, and the biocontainer tubing and fittings are pulled through the opening 16 defined through the dunnage. An inflator 17 is then attached to the inflatable dunnage port 20 and to an air source 19, such as a compressed air source. The inflatable dunnage is then inflated from the air source just enough to take shape and the inflator is disconnected from either the air source or the dunnage fitting/tubing, or both. In an exemplary embodiment, each of the interior seams 33 does not extend to at least one of the end seams 38. In this regard, the interior of all, the chambers 35 are interconnected such that air entering the port (tubings) 20 will be able to inflate all the chamber 35. After assuring that all the biocontainer tubing and/or tubing assemblies penetrating the dunnage are stacked in appropriate corners 40 (or proximate the periphery rigid outer container and over the biocontainer), a lid 42 is placed over the inflatable dunnage and the dunnage inflating fitting/tubing penetrates an opening 44 of the lid. The inflator is then attached again to the air source and/or the dunnage fitting/tubing and the dunnage is further inflated until there is a slight bulge on the lid, and the biocontainer tubing assembly penetrating the opening 16 formed through the dunnage is constrained by the dunnage walls 44 defining the opening 16. A good indicator of a complete fill is when such biocontainer tubing or tubing assembly penetrating the inflatable dunnage is constrained, the lid slightly bulges, and the lid can be slightly compressed by hand. Typically, this would require less than 2 psi of pressure. In an exemplary embodiment, a pressure regulator may also be coupled to the inflatable dunnage to ensure that the appropriate pressure is used to fill the inflatable dunnage. The inflator may then be removed from the inflatable dunnage or tucked away (when disconnected from the air source) through the opening formed on the lid, and a cap is used to cover the lid. Because the compressed air filling the inflatable dunnage is less compressible than foam, and because the inflatable dunnage can be inflated to better fill the void space above the biocontainer, it is capable of applying pressure more evenly against the flexible biocontainer than foam. Consequently, there is less sloshing and movement of the fluid in the biocontainer during shipping than when using a foam dunnage. This results in less wear of the biocontainer, and less cracking and failure of the same. In addition, because the inflated dunnage constrains the biocontainer tubing and/or the fittings of the biocontainer, such tubings and fittings are not damaged during shipping and are not pressed against the biocontainer, thereby preventing damage that is otherwise caused when such fittings are pressed against the biocontainer.

One advantage of the inflatable dunnage of the present invention is that it is much more versatile than standard foam dunnage. For example, a single inflatable dunnage size can be used with multiple fluid volumes biocontainers (i.e., with different size biocontainers) as the inflatable dunnage of the present invention can be filled as necessary for occupying the variable void space between biocontainers and the rigid outer container lids. A fluid filled biocontainer can be filled almost to the top of the rigid outer container or be significantly short of the top and the inflatable dunnage can be designed so that the same inflatable dunnage can be used in both cases. With foam dunnages, on the other hand, different sizes from dunnages would be required for use when shipping biocontainers with varying fill levels.

Applicants believe that more critical than the stiffness of the dunnage is how thoroughly it fills the void space between the biocontainer and the lid. If the pressure is too high, the inflated dunnage will bulge out the lid. With stiffer lids, the dunnage can be filled with more pressure and thus, further press and support to the flexible biocontainer with fluid. However, applicants have discovered that lower pressures, e.g., 2 psi work well also.

The inflatable dunnage of the present invention can be returned to the sender for re-use much more economically because it easily deflates and collapses into a small space. It can be sent back to the sender within the collapsible rigid outer container. With traditional foam dunnage, the polymeric foam forming the dunnage (which is usually a large piece) must be disposed of at the point of product use as it will not fit in a collapsed rigid outer container for return.

Although the present invention has been described and illustrated with respect to exemplary embodiments, it is to be understood that it is not so limited, since changes and modification may be needed which are within the full scope of the invention. For example instead of air, the dunnage of the present invention may be inflated with other gases, including but not limited to Nitrogen, and may also be inflated using other fluids. However, air may be the preferred mode for inflating as it is light in weight and will not add to overall weight of the package including the biocontainer to be used and allows for easy deflation of the dunnage without having to collect it. With fluids such as liquids, there is also the concern for leaks during shipment

What is claimed is:

1. A shipping package for a biocontainer containing a fluid comprising:

a rigid outer container;

a flexible biocontainer within the outer container, said biocontainer comprising at least one of a tubing and a fitting;

an inflated dunnage over the biocontainer, said dunnage having at least an opening penetrated by said at least one of a tubing and fitting, said dunnage comprising a port through which said dunnage is inflated; and a lid over the dunnage, wherein the inflated dunnage is sandwiched between the biocontainer and the lid, and wherein the dunnage exerts pressure on said biocontainer and on said lid as well as on at least a wall of the rigid outer container, wherein at least one of said outer container and lid comprises an opening for providing access to said port for inflating said dunnage.

2. The package as recited in claim 1, wherein said inflated dunnage engages said at least one of a tubing and a fitting for providing support to said at least one of a tubing and a fitting.

3. The package as recited in claim 1, wherein the lid comprises said opening for providing access to said port of said inflated dunnage.

4. The package as recited in claim 3, further comprising a cap for capping said opening on said lid.

5. The package as recited in claim 1, wherein the dunnage is formed from a film comprising at least one of a polyamide and polyethylene.

6. The package as recited in claim 1, wherein the inflatable dunnage comprises a plurality of chambers.

7. The package as recited in claim 1, wherein the dunnage is inflated with air.

8. A method for packing a biocontainer for shipping, said biocontainer having been placed within a rigid outer container, said biocontainer containing a fluid and comprising at least one of a tubing and a fitting, the method comprising:

placing an inflatable dunnage over said biocontainer containing fluid, said dunnage comprising an opening, wherein at least one of said at least one of a tubing and a fitting penetrates said opening;

placing a lid over said dunnage; and inflating said dunnage to a desired level after placing said lid.

9. The method as recited in claim 8, wherein inflating said dunnage to said desired level comprises inflating said dunnage for exerting a force against said biocontainer, said rigid outer container, and said lid.

10. The method as recited in claim 9, wherein the dunnage comprises an inflating port, wherein said lid comprises an opening, and wherein said dunnage inflating port extends through said opening.

11. The method as recited in claim 10, further comprising capping said lid opening with a cap.

12. The method as recited in claim 10, further comprising partially inflating said dunnage prior to placing said lid.

13. The method as recited in claim 12, wherein partially inflating comprises partially inflating said dunnage until said partially inflated dunnage provides support to said at least one a tubing and a fitting.

14. The method as recited in claim 13, wherein inflating said dunnage for exerting a force comprises inflating said dunnage until said lid starts to bulge.

15. The method as recited in claim 14, wherein said dunnage is inflated to a pressure not greater than 2 psi.

16. The method as recited in claim 13, further comprising capping said lid opening with a cap after said inflating said dunnage.

17. The method as recited in claim 8, wherein said dunnage is inflated to a pressure not greater than 2 psi.

18. The method as recited in claim 8, wherein the inflatable dunnage is formed from a film comprising at least one of a polyamide and polyethylene.

19. The method as recited in claim 8, wherein said inflated dunnage fills a void between said biocontainer and said lid.

20. The method as recited in claim 8, wherein said dunnage comprises a plurality of chambers.

21. An inflatable dunnage for use in transporting biocontainers comprising:

an inflatable body having an opening extending through said body for receiving at least one of a tubing and a fitting of a biocontainer;

a port for the inlet of air; and a valve coupled to said port for controlling the inlet and outlet of air.

22. The dunnage as recited in claim 21, wherein the body is formed from a film comprising at least one of a polyamide and a polyethylene.

23. The dunnage as recited in claim 21, wherein the inflatable body comprises a plurality of chambers.

* * * * *